United States Patent [19]
Dziesietnik et al.

[11] Patent Number: 6,134,018
[45] Date of Patent: *Oct. 17, 2000

[54] METHOD AND APPARATUS FOR CREATING PERSONALIZED DOCUMENTS THAT INCLUDE VARIABLE DATA

[75] Inventors: Ghilad Dziesietnik, Palo Alto; Danielle Beaumont, San Francisco; Luis Trabb Pardo, Palo Alto, all of Calif.

[73] Assignee: Electronics for Imaging, Inc., Foster City, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,042

[22] Filed: Sep. 26, 1997

[51] Int. Cl.$^7$ ...................................................... G06F 15/00
[52] U.S. Cl. ......................................... 358/1.15; 358/1.18
[58] Field of Search .................................... 382/235, 303, 382/304, 232; 395/114, 117; 707/515; 345/502, 707, 507, 508, 527, 435, 191, 202, 505–506; 358/540, 462, 450, 1.15, 1.16, 1.17, 1.18, 1.13, 1.12, 1.6, 1.1, 426, 433, 453, 448, 467

[56] References Cited

U.S. PATENT DOCUMENTS

| | | | |
|---|---|---|---|
| 4,527,252 | 7/1985 | Donohue et al. | 395/110 |
| 4,776,028 | 10/1988 | Tanaka et al. | 382/244 |
| 5,043,749 | 8/1991 | Punater et al. | 346/153.1 |
| 5,113,494 | 5/1992 | Menendez et al. | 395/163 |
| 5,136,316 | 8/1992 | Punater et al. | 346/153.1 |
| 5,715,382 | 2/1998 | Herregods et al. | 395/117 |
| 5,825,348 | 10/1998 | Ludolph et al. | 345/115 |
| 5,845,302 | 12/1998 | Cyman, Jr. et al. | 707/517 |

OTHER PUBLICATIONS

"Personalized Printing—Adobe's© Personalization Stretegy for the Supra Production Printing Architecture", Oct. 1996.

*Primary Examiner*—Dov Popovici
*Attorney, Agent, or Firm*—Michael A. Glenn; Donald M. Hendricks

[57] ABSTRACT

A technique is described for adding variable data to a print job, while requiring a minimum amount of storage. Key to the invention is the use of a data compression algorithm during RIPing. During a first stage of operation, a master document is RIPed into a compressed format and saved in a cache, such as RAM or disk storage. It is important to note that RIPing and data compression are performed simultaneously. This minimizes the amount of processing power necessary to RIP and compress a large document, while significantly reducing the amount of storage space required to save the RIPed master document. The variable data document is RIPed and compressed during a second stage of operation using the same algorithm as applied to the master document. Uniquely, the variable data document is RIPed directly onto the master document in compressed format. During the second phase of operation, the master document to be personalized is retrieved from memory and stored in a frame buffer. The variable data document is RIPed in compressed format directly into the frame buffer. A compressed file that results may be decompressed and forwarded to the print engine.

26 Claims, 4 Drawing Sheets

METHOD AND APPARATUS FOR CREATING PERSONALIZED DOCUMENTS THAT INCLUDE VARIABLE DATA

BACKGROUND OF THE INVENTION

1. Technical Field

The invention relates to printing data that are stored in an electronic format. More particularly, the invention relates to a method and apparatus for printing variable data.

2. Description of the Prior Art

A personalized print job is a description of a document composed of a number of copies, where each copy can be uniquely customized for the intended recipient. The pages are composed of text, graphics, and images which can be unique to just that copy, identical on every copy, or used on some copies of the document but not on others. For example, in a customized product brochure, unique elements can include the recipient's name and address, while the product company name and logo are identical on every copy, and the picture of the specific product that the recipient is interested in is found on some copies of the document, but not on others.

A personalization system includes every component that is required to build and print a personalized job. The front end of the system is the job creation process, which is generally driven by a database and authoring applications which build the description of a personalized job. The system also includes a raster image processor (RIP) and a printing system on the back end, which is optimized for the characteristics of the job, i.e. to print the job as fast as is possible.

The RIPing system needs to be able to deliver pages at least as fast as the rated engine speed of the output device. To this end, it must be possible to design a document that is largely made up of reusable page elements. Page elements can be text, graphics, images, or a combination. Each personalized copy of a job can contain some unique information and some subset of these reusable page elements arranged by the template designer. Some of these elements are only used once, some are used on every copy of the document, and some are used only on select copies.

In a personalized job, page elements need only be RIPed once, then combined at the print engine. By only RIPing each element one time, unique documents can be delivered on-the-fly as quickly as possible.

Until now, personalized printing has been limited primarily to mass mailings such as utility and credit card bills, and specialized direct mail pieces. Applications are highly specialized for these specific uses and are costly to implement. Typically applications have a high development cost, but generate very large volumes resulting in a low per-copy cost.

For example, target marketing is generally considered to be less expensive and more effective than mass campaigns. Using demographic information to customize messages to the target audience produces significantly higher response rates. As time goes on, more and more information is being collected from customer transactions. Companies use this information to customize their messages to their audience. They are then able to minimize their costs while realizing a greater return on investment.

The demand is growing for easy-to-use applications to build personalized jobs. At the same time, direct digital printing systems are needed to produce the output.

Personalization systems exist today that allow an entire job to be done on the desktop. These systems include a design creation application for building the layout of the documents. Page elements and variable data information are stored nearby, either on the desktop machine, or accessible via a server. The design creation application merges the variable data (and possibly page elements such as images, graphics, or text blocks) with the layout design, outputting a single file intended for one press run. The entire task is accomplished at a single workstation in a single application. This simple workflow can be easy to use but is not practical for use with very large data sets.

In a different model for personalized publishing, the creator of the document design does not necessarily have access to the variable data, which is most likely stored in a database somewhere. The artist necessarily has some knowledge of the library data, but doesn't always have direct access to it. The design layout may be a relatively small file, and is merged with the variable data at a later time and potentially at a different location. The design layout, being separate from the variable data, may be reused many times with different variable data. This workflow is appropriate for very large press runs and for documents that may be used repeatedly, possibly in a distributed printing environment.

The following are a few examples of personalized publishing. They represent a very small subset of the possibilities, but are a good starting point for understanding the complexities personalization presents.

Supermarket Flyer Coupons

Imagine receiving supermarket flyers in the mail which have been customized to contain product offerings that you are most interested in. The flyers are customized for each individual recipient based on demographics which have been compiled over time about buying habits. Every coupon you receive has a high probability of being for a product you are interested in.

In this example, a layout is designed with spaces set aside for several grocery store coupons, the customer's name and address, and some common graphics (store logo, picture of the store, seasonal graphics, etc.). A library of coupons is designed to fit into the flyer design. The store might have hundreds or even thousands of items and might also have more than one coupon per item. The task is to print a flyer for each person on the mailing list, and optimize the coupon choices to their preferences. If a person receives just six targeted coupons, then it is less likely that the flyer will be thrown away unread and more likely that it will generate sales.

Credit Card Billings

Credit card companies mail out bills monthly to millions of recipients. Typically, there are a couple of different kinds of pages in the bill. The first page has a header containing the customer's contact information, the company logo, and any special notices. It also contains a list of credit card purchases made that month. It might have a "Past Due" notice for customers that did not pay anything on the previous month's balance.

The second page lists more purchases extending the list from page one. There may be more pages that look like page two, each listing additional purchases made. The total number of pages in the bill can vary depending on the customer's spending that month. On the last page of the bill, there is a summary of the information including the total amount due from all purchases and additional notices to this customer, like frequent flyer miles awarded, bonuses, etc.

Inside credit card bills received today, one often receives additional flyers which are advertising something to buy. In the future, those advertisements may be part of the bill itself, and can be customized to target the specific customer.

Today, such bills are printed in two separate processes. An offset printer creates the background, or static information for the bill. A second printing process creates all of the variable information, which is limited to black text. By changing this model to be personalized and printed on one device instead of two, more customized information (such as advertisements or overdue notices printed in red) can be printed on the bills, and the process is streamlined by not having to manage two different printing systems.

Custom Catalogs

Catalog companies have found that the majority of sales orders are called in within the first few days after customers receive a new catalog. Therefore catalogs appear monthly (or even weekly) in mailboxes. There is a huge amount of waste associated with repeatedly mailing catalogs whose content changes very little from issue to issue.

Personalization could save catalog companies considerable printing expense while increasing sales at the same time, not to mention the reduction in paper waste. Many customers throw away entire catalogs without even opening them if they arrive at a time when the customer is not in the mood to buy. A personalized catalog would be much smaller and would only contain similar items to which the customer has a history of purchasing. The customer is more likely to thumb through such a personalized catalog before discarding it if there are only a few pages to glance at instead of a couple hundred. The customer is also much more likely to see something that catches his/her eye.

Personalization solution sets contain many components built by different vendors. They are made up of authoring tools, databases, page element libraries, a RIPing system, and a print engine. The different parts are built by ISVs and OEMs.

FIG. 1 is a block schematic diagram that shows a general description of the data flow of a personalization front-end system. The front-end of a personalization system is composed of all of the applications necessary to build a personalized job that is delivered to the RIP. FIG. 1 depicts a simple data flow of the front-end applications. It does not show the workflow which is described in more detail later. Such applications come in many shapes and sizes. Most personalization applications contain the above components in one form or another, but do not necessarily use them in the same ways. The majority of the front-end applications are built by third party developers specializing in layout design, building graphics, and database design and access.

The following is a general description of the components of a front-end system.

Database 14

Contains all of the information that are queried to generate the data set. It may contain demographics for target customers who receive customized bills or sales information. It could also contain information about a region of the country to drive specific versions of a sale catalog. For example, prices may differ by region, or depending on the current weather in the area, specific kinds of clothes could be chosen.

Page Elements 10

The different components of pages that can be varied on different copies of the document. Each element could be a description of a graphic, an image, a block of text, or a combination.

Template 12

A description of the layout (location, bounding box, orientation, etc.) of the elements on a page. A job might have templates for several different pages. Each copy of the document could be made up of a different number of pages using, and possibly reusing, some or all of the templates.

Merger 16

Builds the personalization specification file of the job. It uses the templates, page elements, and database queries to build a description of the final print job. The output of the Merger is a personalized job 18.

In the above example, the components of the process for building a personalized job are separate. Ideally, there are different people with different areas of expertise building each of the components of the job.

The page elements library is built by different artists, or potentially by scanning in different elements. There may be many sources of input for each page element.

The template is built by a graphic artist or report designer who creates the layout of the document. This person needs some minimal information about the page elements (such as size, rotation, etc.) but does not need to have direct access to the data to build the design. The artist also wants to take into account what database fields contain information to be used in the layout. Again, the specific data is not needed, just information about it. Tools will be built to make this design process as easy as possible. A clean user interface is needed for describing the representation of the page elements, including location, rotation, scale, and bounding box.

The database is most likely built by an information systems professional. The data can be directly generated from different sources of input such as credit card purchase information, past orders from mail catalogs, etc.

FIG. 2 is a block schematic diagram that illustrates how the personalization components fit into a prior art RIPing system. In the prior art (such as the Supra product manufactured by Adobe Systems Inc.(see Personalized Printing, Adobe Systems Inc. (October 1996)); see, also D. Punater, R. Gaspar, V. Kubert, M. Duchesne, Printing Press and Method, U.S. Pat. No. 5,043,749 (Aug. 27, 1991) and D. Punater, R. Gaspar, V. Kubert, M. Duchesne, Printing Press and Method, U.S. Pat. No. 5,136,316 (Aug. 4, 1992), the focus is on RIPing jobs in a page-parallel basis for fast throughput. The RIPed pages are then combined at the print engine. The prior art provides the ability to cache and reuse RIPed page elements. Multiple RIPs are used to process page elements in parallel. When this is combined with the reusability of those page elements, the result is improved performance for printing personalized jobs.

The merging is an automatic process generally done on a server. There should be no manual intervention necessary. All of the rules regulating database queries and what to do with nonstandard data should be defined before the merging takes place. The merger is tasked with building a personalized job. It queries the database to determine which information to place in each copy of the personalized document. It also specifies how many pages go in each copy, which template to use for each page, and which page elements to use in each of the fields in the template.

The output of the merging process is a personalized job. This job contains a description of the unique data for every copy of the document, as well as the page elements and templates. It also describes how to access each component.

The RIPing component of a prior art personalization system lies in between the front-end system and the print engine. It receives as input from the front-end. The RIP is also tightly integrated with the print engine which outputs the resulting personalized print run.

Personalized jobs 18 are delivered to the coordinator 20 inside Adobe's Supra product. The personalization module 22 is notified, and it then begins processing the file. The primary purpose of the personalization module is the management of page elements which are contained in the page element store 23. The personalization module controls their flow in and out of the system, their rasterization by the various RIPs 27a–27c, and their caching. As the variable data information comes in from the job source, the personalization module determines which page elements are required, whether they have already been rasterized, and which templates are required for the page. It also processes this information into a simplified form, which it then passes to the compositor 25 (described below). The compositor, in conjunction with an assembler 24, then uses this information to compose the rasterized page elements into the finished page which is delivered to the print engine 26 for printing.

The page store contains the variable information, page elements, and templates. Because the page elements and templates are only referenced in the variable data stream, they must be accessed and cached locally to optimize performance. The page element store, which in a non-personalization system contains only full-page raster data, contains rasterized page elements during a personalized job. The personalization module does not send elements to the RIPs twice.

The resource checker 21 communicates directly with the personalization module to verify that all the necessary page elements and templates are present. It does a preflight operation to ensure that the job prints successfully.

The compositor is responsible for combining the rasterized page elements into a final form for delivery to the print engine in real time. It knows the order in which to paint the page elements. Compositors have a full frame buffer of memory to use, several frame buffers, or maybe only enough memory for several bands. Some compositors composite multiple page elements at once, reading multiple channels simultaneously from the bitmap cache.

One disadvantage of such prior art techniques is the amount of memory and processing power required to store and merge the various elements of a job. Further, although there is some speed enhancement with such approaches, performance is still far short of that required for most commercial applications. It would be advantageous to provide a system in which jobs and applications require less compute power and less storage space, and in which RIPing and processing speed is increased.

SUMMARY OF THE INVENTION

The invention provides a simple and fast technique for adding variable data to a print job, while requiring only a minimum amount of storage. Key to the invention is the use of a data compression algorithm during RIPing. During a first stage of operation, a master document is RIPed into a compressed format and saved in a cache, such as RAM or disk storage. It is important to note that RIPing and data compression are performed simultaneously. This minimizes the amount of processing power necessary to RIP and compress a large document, while significantly reducing the amount of storage space required to save the RIPed master document.

The variable data document is RIPed and compressed during a second stage of operation. The variable data document is RIPed and compressed using the same algorithm as applied to the master document. Uniquely, the variable data document is RIPed directly onto the master document in compressed format. During the second phase of operation, the master document to be personalized is retrieved from memory and stored in a frame buffer. The variable data document is RIPed in compressed format directly into the frame buffer.

Once the master document and variable data document are merged, the compressed file that results may be decompressed and forwarded to the print engine.

DETAILED DESCRIPTION OF THE INVENTION

The invention provides a method and apparatus for variable data printing. The invention provides, for example, the following capabilities:

The ability to split variable jobs by master and changeable elements, significantly decreasing the overall RIP time of a variable job. For example, instead of printing a series of 50 Mb files for a standard job, the invention downloads and RIPs one 50 Mb file and a series of 1 Mb files;

The ability to create master and varying elements on any platform in any application;

Merged data can be as simple or complex as the user chooses, with no limitation on the number or placement of varying elements per page or job;

Varying elements may be transparent or opaque, they may overlay one another, and they may be freely rotated or scaled;

The master document may be multiple pages (for example an eight page brochure);

Merged data may include any combination of color or black and white text, graphics and images in as many places, and in whatever size, the user defines;

Master jobs may be defined and selected from several locations. Any supported driver (e.g. by way of a printer profile definition (PPD) option); and The system application program interface (API) allows any front-end application to break out both master and variable elements in a PostScript stream, thereby offering automatic variable data support which does not require user intervention.

Figure 1:
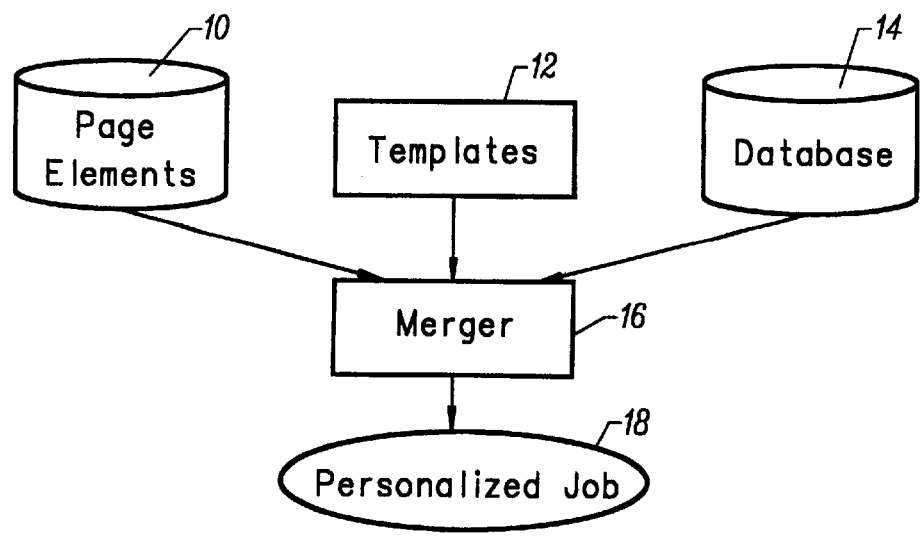
FIG. 1 is a block schematic diagram that shows a general description of the data flow of a personalization front-end system.
Figure 2:
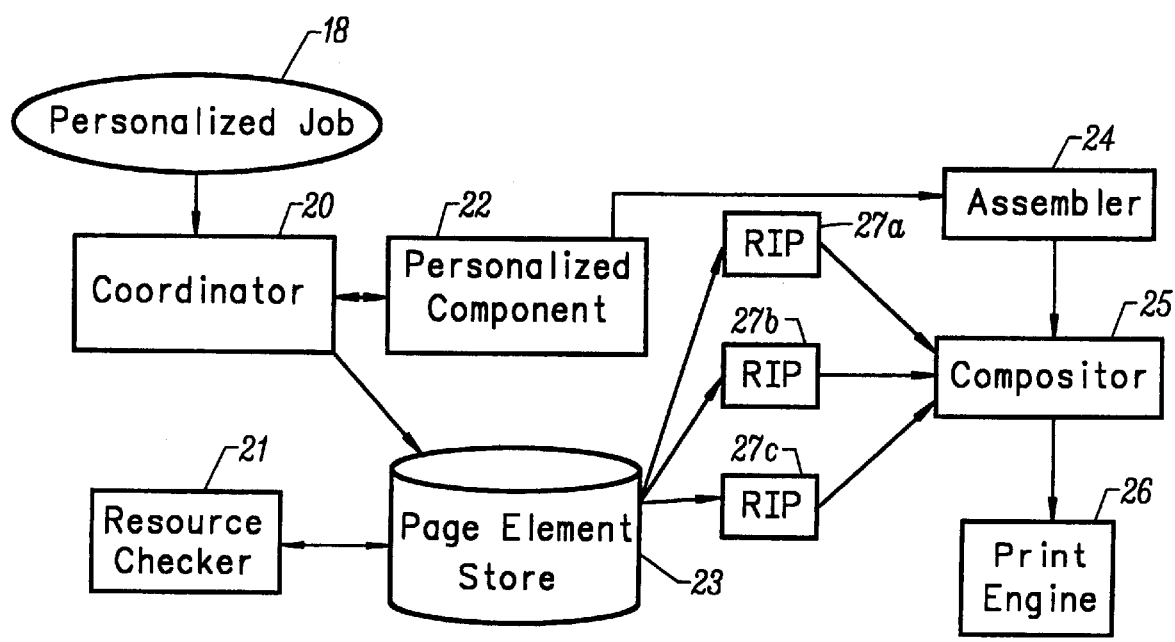
FIG. 2 is a block schematic diagram that illustrates how the personalization components fit into a prior art RIPing system.
Figure 3:
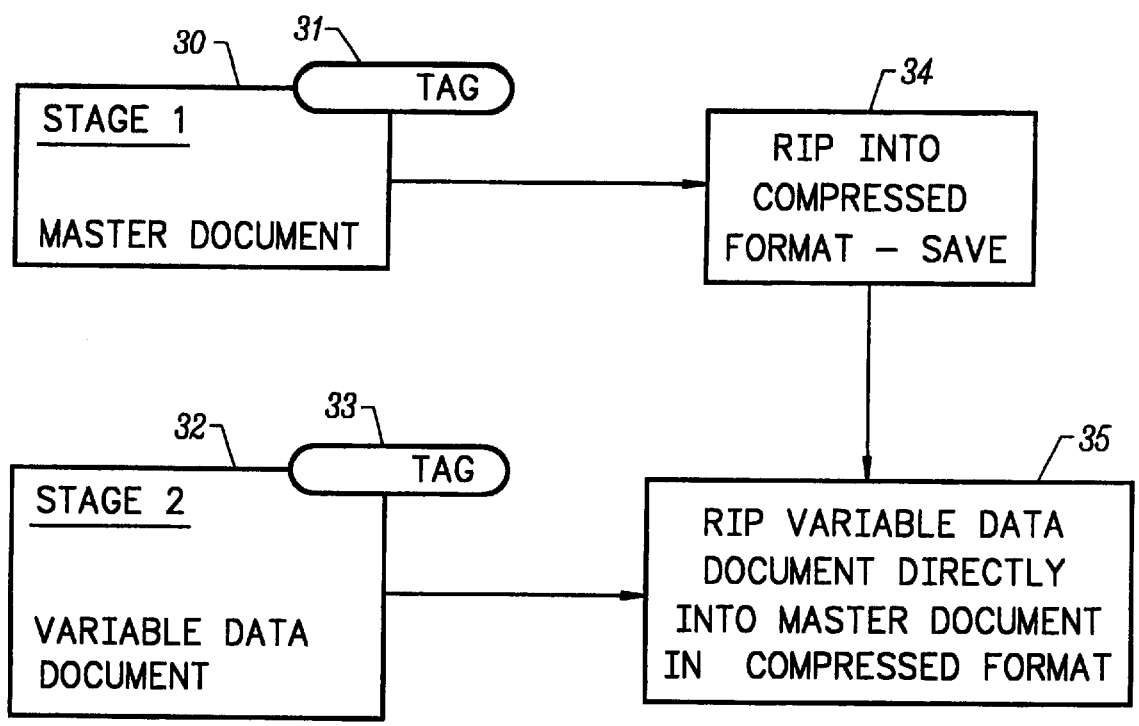
FIG. 3 is a block schematic diagram of an apparatus for variable data printing according to the invention.

FIG. 3 is a block schematic diagram of an apparatus for variable data printing according to the invention. The invention provides a simple and fast technique for adding variable data to a print job, while requiring a minimum amount of storage. Key to the invention is the use of a data compression algorithm during RIPing. The algorithm may be any suitable data compression technique, such as run length encoding or discrete cosine transformation (DCT) encoding. The preferred embodiment of the invention alternatively employs either of the YCT and ACS data compression algorithms, which are described in Y. Accad, Method and Apparatus for Hybrid Compression of Raster Data, U.S. patent application Ser. No. 08/773,656, filed Dec. 24, 1996 and L. T. Pardo, Processor/Memory Non-Intensive Rendering for Page Printers, U.S. patent application Ser. No. 08/497,477, filed Jul. 3, 1995, which are incorporated herein by this reference thereto.

During a first stage of operation, a master document 30 is RIPed into a compressed format and saved in a cache 34, such as RAM or disk storage. It is important to note that RIPing and data compression are performed simultaneously. This minimizes the amount of processing power necessary to RIP and compress a large document, while significantly reducing the amount of storage space required to save the RIPed master document. For example, a 128 Mb frame buffer can be compressed to about 1 Mb or less using the technique herein described. While in this compressed format, the master document may be viewed as a thumbnail, i.e. a miniature representation of the master document. As such, the master document (which may be one of many master documents) may be readily identified and managed.

The master document includes a tag 31 that uniquely identifies it to the system, for example as a master document, including the particular page number in the case of a multi-page master document, The tag may be a file header or other known identification scheme. Tag recognition is a function of reading the header or other such tag information and processing the document appropriately. For example, a master document is written into a frame buffer before the variable data are added to the document.

The variable data document 32 is RIPed and compressed during a second stage of operation. As with the master document, the variable data document may include a tag 33 which specifies that the document is a variable data document, that identifies the master document to which the variable data document belongs, and that identifies the page in a multi-page master document for which the variable data document is intended.

The variable data document is RIPed and compressed using the same algorithm as applied to the master document. Uniquely, the variable data document is RIPed directly onto the master document in compressed format. It is preferred that the master documents be cached in a database for repeated access and use. During the second phase of operation, the master document to be personalized is retrieved from memory and stored in a frame buffer. The variable data document is RIPed in compressed format directly into the frame buffer.

Figure 4:
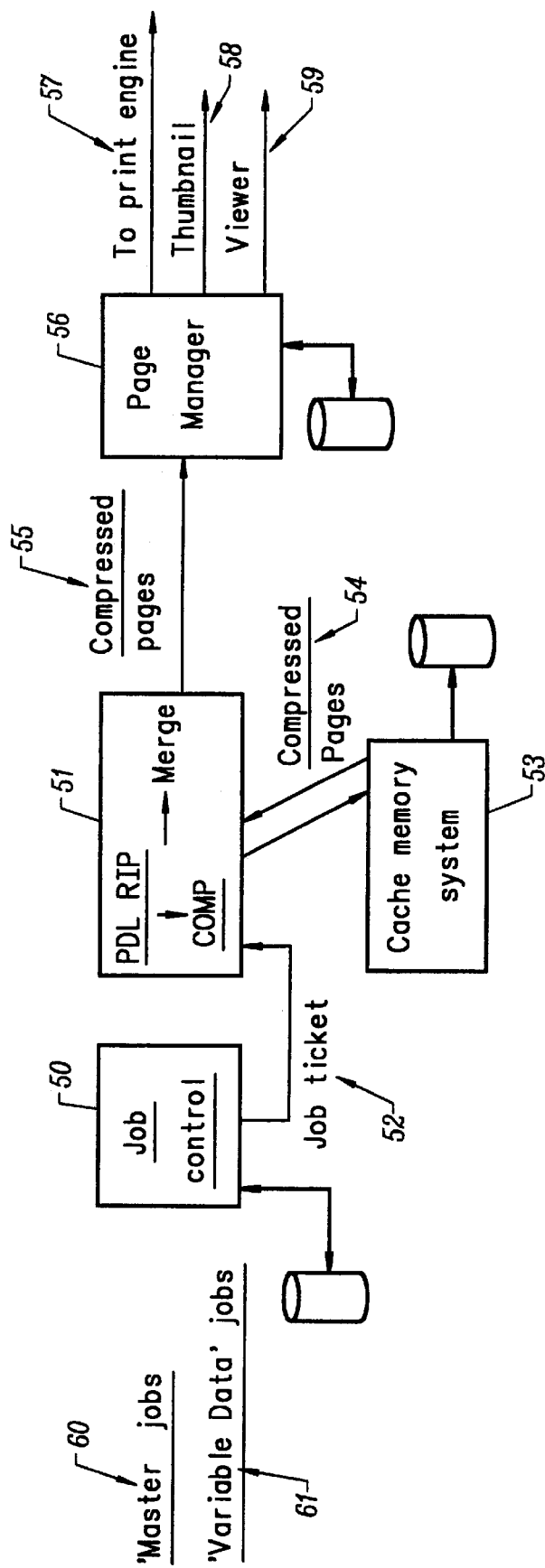
FIG. 4 is a more detailed block schematic diagram of an apparatus for variable data printing according to the invention.

FIG. 4 is a more detailed block schematic diagram of an apparatus for variable data printing according to the invention. For purposes of the discussion herein, the term "tag" above is also referred to herein as a "job ticket." The invention provides a job ticketing language that specifies that ways a document is to be processed and was developed. In accordance with the operating principles set forth above, a print job comprises both a master job 60 and a variable data job 61. A job control circuit 50 extracts a job ticket 52 from each job, i.e. from the master job and the variable data job. Job ticketing allows the user to specify the master pages and the personalized pages. It also allows the set of utilities that process this information to act upon it or change it according to modified specification. The job ticket technique is PDL independent in the preferred embodiment of the invention, and thus allows the use of any front end PDL 51 for defining the master and variable data documents, e.g. PostScript, PDF, and PCL.

The cache memory system 53 stores RIPed compressed pages 54 and provides them to the merge operation in accordance with information contained in the job ticket. The merged compressed pages 55 are then provided to a page manager 56, and thence output to any of the print engine 57, as a thumbnail 58 (as discussed above), or to a viewer 59.

The following is an example of a job ticket description:
EFI$_{13}$FF: CreateMaster form: "name"
EFI$_{13}$FF: UseMasterForm: "name", page number e.g. 1,2, 3,4,7,1 . . .
EFI$_{13}$FF: DeleteMaster: "name"
EFI$_{13}$FF: RenameMaster: "name", "name"
EFI$_{13}$FF: CreatePrintMaster: "name"
EFI$_{13}$FF: PrintMaster: "name"
EFI$_{13}$FF: PrintCopies: "n"

Figure 5:
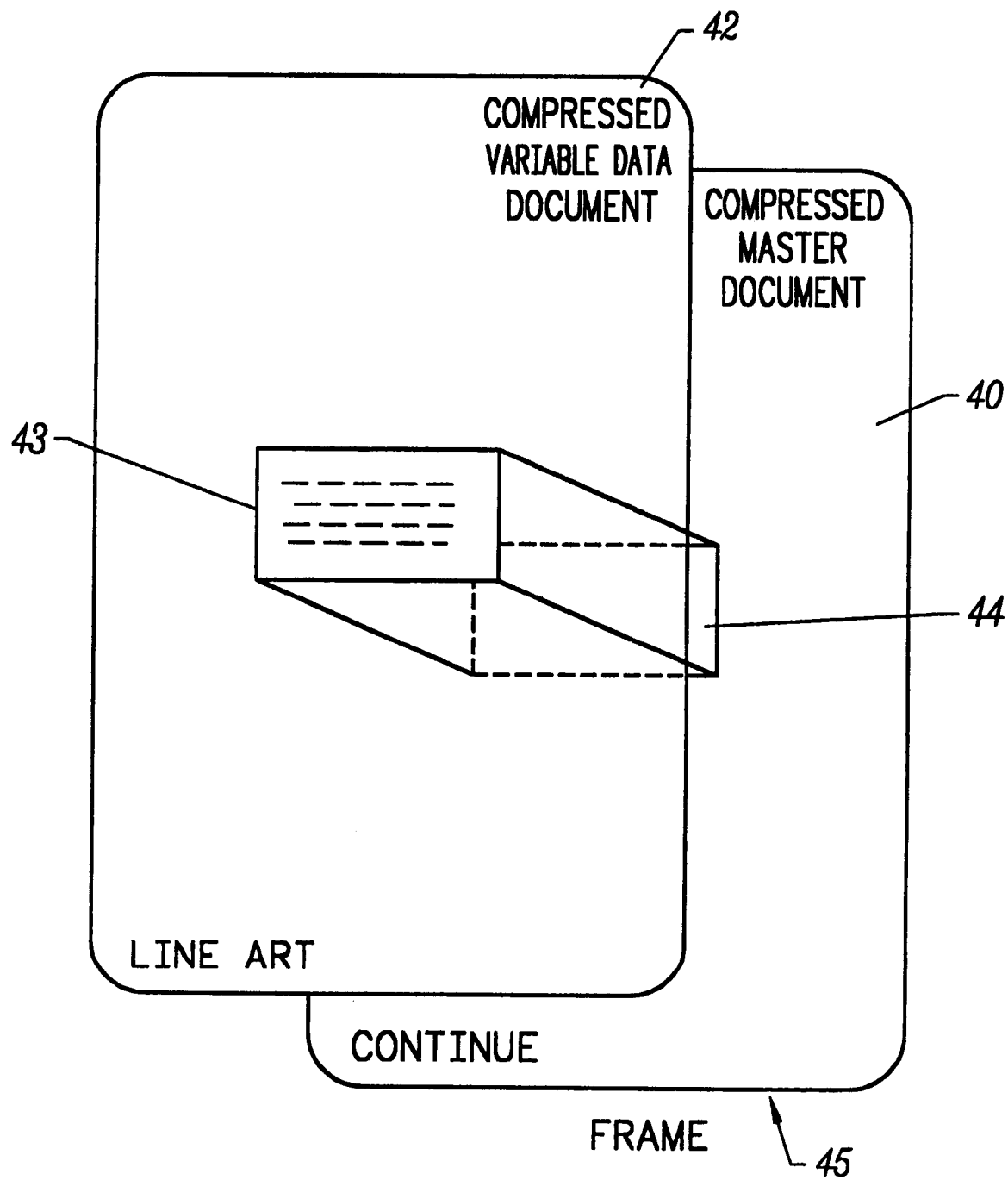
FIG. 5 is an illustration of a print frame, showing a master/variable data merge operation according to the invention.

FIG. 5 is an illustration of a print frame, showing a master/variable data merge operation according to the invention. As shown in FIG. 4, the compressed master document 40 is contained in a frame 45, e.g. a frame buffer, in compressed format. Each of the master document and variable data document may contain any type of information including, for example, contone, halftone, image, graphic, gray scale, color, and text information. The example of FIG. 4 shows the master document as a contone document. In the example, a line art variable data document 42 includes a personalized portion 43 that is to be added to a corresponding region 44 in the master document. When the master and variable data documents are merged, the variable data are written over the master document data in the frame buffer, replacing the data within the region 44 of the master document with the personalization information contained in the region 43 in the variable data document.

Once the master document and variable data document are merged, the compressed file that results may be decompressed and forwarded to the print engine.

Operation of the invention is both fast and simple. The use of compression allows personalization to be performed within a system that contains a minimal amount of memory. Further, because less data are being manipulated, the actual processing time is necessarily much shorter. This makes such operations as scaling or rotation much less complex and much less time consuming.

Although the invention is described herein with reference to the preferred embodiment, one skilled in the art will readily appreciate that other applications may be substituted for those set forth herein without departing from the spirit and scope of the present invention. For example, the technique herein described can be used with multiple levels of personalization, provided a painter's algorithm, i.e. a bottom to top algorithm, is used to composite the document. This is accomplished by RIPing each successive variable data document directly onto the frame buffer. Additionally, the variable data document need not be RIPed directly onto the frame buffer. Rather, the variable data document may first be stored in memory, and then retrieved from memory and written to the master document contained in the frame buffer. However, in this case the variable data document is nonetheless RIPed and compressed simultaneously prior to storage in memory. Accordingly, the invention should only be limited by the Claims included below.

What is claimed is:

1. A method for creating personalized documents that include variable data, comprising the steps of:

providing a master data document having at least one reusable master page element;

raster image processing (RIPing) and simultaneously data compressing said master data document;

storing said RIPed and data compressed master data document in a memory;

querying a first database to create a variable data document having at least one reusable variable page element;

RIPing and simultaneously data compressing said variable data document directly onto said RIPed and data compressed master data document to create a personalized document;

decompressing a compressed file that represents said personalized document; and forwarding said decompressed file to a print engine.

2. The method of claim 1, wherein said master data document and said variable data document are compressed using a standard compression algorithm.

3. The method of claim 2, wherein said standard compression algorithm is either of run length encoding and discrete cosine transformation (DCT) encoding.

4. The method of claim 1, wherein said master data document and said variable data document are compressed using either of a YCT and ACS data compression algorithm.

5. The method of claim 1, further comprising the step of:

viewing any of said master data document, said variable data document, and said personalized document while said documents are in a compressed format, wherein said documents are viewed as a thumbnail.

6. The method of claim 1, further comprising the step of:

providing said master data document with a tag that uniquely identifies the master data document as a master data document.

7. The method of claim 6, wherein said tag identifies a particular page number in the case of a multi-page master data document.

8. The method of claim 1, further comprising the step of:

providing said variable data document with a tag which specifies that the document is a variable data document, and that optionally identifies the master data document to which said variable data document belongs and a particular page in a multi-page master data document for which said variable data document is intended.

9. The method of claim 1, wherein said master data document is cached in a second database for repeated access and use.

10. The method of claim 1, wherein each of said master data document and said variable data document may contain any type of information, including contone, halftone, image, graphic, gray scale, color, and text information.

11. The method of claim 1, wherein multiple levels of personalization are provided; and wherein a painter's algorithm is used to composite said personalized document.

12. The method of claim 11, further comprising the step of:

RIPing each successive master data document directly onto a compressed frame buffer.

13. The method of claim 12, wherein said variable data document is first stored in said memory, and then retrieved from said memory and written to said master data document in said compressed frame buffer.

14. An apparatus for creating personalized documents that include variable data, comprising:

a module for raster image processing (RIPing) and simultaneously data compressing a master data document having at least one reusable master page element;

a memory for storing said RIPed and data compressed master data document in said memory;

a module for querying a first database to create a variable data document having at least one reusable variable page element;

a module for RIPing and simultaneously data compressing said variable data document directly onto said RIPed and data compressed master data document to create a personalized document;

a module for decompressing a compressed file that represents said personalized document; and a module for forwarding said decompressed file to a print engine.

15. The apparatus of claim 14, wherein said master data document and said variable data document are compressed using a standard compression algorithm.

16. The apparatus of claim 15, wherein said standard compression algorithm is either of run length encoding and discrete cosine transformation (DCT) encoding.

17. The apparatus of claim 14, wherein said master data document and said variable data document are compressed using either of a YCT and ACS data compression algorithm.

18. The apparatus of claim 14, further comprising:

means for viewing any of said master data document, said variable data document, and said personalized document while said documents are in a compressed format, wherein said documents are viewed as a thumbnail.

19. The apparatus of claim 14, further comprising:

a first tag that uniquely identifies the master data document as a master data document.

20. The apparatus of claim 19, wherein said first tag identifies a particular page number in the case of a multi-page master data document.

21. The apparatus of claim 14, further comprising:

a second tag which specifies that a document is said variable data document, and that optionally identifies said master data document to which said variable data document belongs and a particular page in a multi-page master data document for which said variable data document is intended.

22. The apparatus of claim 14, wherein said master data document is cached in a second database for repeated access and use.

23. The apparatus of claim 14, wherein each of said master data document and said variable data document may contain any type of information, including contone, halftone, image, graphic, gray scale, color, and text information.

24. The apparatus of claim 14, wherein multiple levels of personalization are provided; and wherein a painter's algorithm is used to composite said personalized document.

25. The apparatus of claim 14, further comprising:

a module for RIPing each successive master variable data document directly onto a compressed frame buffer.

26. The apparatus of claim 25, wherein said variable data document is first stored in said memory, and then retrieved from said memory and written to said master data document in said compressed frame buffer.

* * * * *